(12) United States Patent
Zhang et al.

(10) Patent No.: US 12,165,194 B2
(45) Date of Patent: Dec. 10, 2024

(54) METHOD AND APPARATUS FOR ENTERING REVIEW INTERFACE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yubo Zhang, Beijing (CN); Jinping He, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 297 days.

(21) Appl. No.: 17/354,851

(22) Filed: Jun. 22, 2021

(65) Prior Publication Data

US 2021/0319500 A1 Oct. 14, 2021

Related U.S. Application Data

(63) Continuation of application No. PCT/CN2019/127925, filed on Dec. 24, 2019.

(30) Foreign Application Priority Data

Jan. 9, 2019 (CN) .......................... 201910018018.7

(51) Int. Cl.
*G06Q 30/00* (2023.01)
*G06F 3/01* (2006.01)
(Continued)

(52) U.S. Cl.
CPC ......... *G06Q 30/0643* (2013.01); *G06F 3/017* (2013.01); *G06F 16/285* (2019.01);
(Continued)

(58) Field of Classification Search
CPC ........... G06Q 30/0643; G06Q 30/0282; G06Q 30/0623; G06F 16/285; G06F 16/9035; G06F 3/017
See application file for complete search history.

(56) References Cited

U.S. PATENT DOCUMENTS 7,552,068 B1 * 6/2009 Brinkerhoff ....... G06Q 30/0236
705/14.36
8,001,003 B1 * 8/2011 Robinson ........... G06Q 30/0201
705/7.29
(Continued)

FOREIGN PATENT DOCUMENTS

CN 105786976 A 7/2016
CN 106155311 A 11/2016
(Continued)

OTHER PUBLICATIONS

Feng, He, and Xueming Qian. "Mining user-contributed photos for personalized product recommendation." Neurocomputing 129 (2014): 409-420. (Year: 2014).*

(Continued)

*Primary Examiner* — Matthew E Zimmerman

(57) ABSTRACT

Embodiments of the present application provide a method and an apparatus for entering a review interface, a terminal device scans a target object through an AR scanning method to obtain a first signal, sends a first request message to a server according to the first signal to request for a review interface, and after receiving the first request message, the server sends a first response message carrying data used to generate an interface of a product to be reviewed to the terminal device. In the process, after the terminal device enters a web page of an electronic commerce platform, a review interface can be entered by AR scanning, thereby achieving a purpose of entering the review interface rapidly.

9 Claims, 12 Drawing Sheets

(51) Int. Cl.
  *G06F 16/28* (2019.01)
  *G06F 16/9035* (2019.01)
  *G06Q 30/0282* (2023.01)
  *G06Q 30/0601* (2023.01)
(52) U.S. Cl.
  CPC ..... *G06F 16/9035* (2019.01); *G06Q 30/0282* (2013.01); *G06Q 30/0623* (2013.01)

(56) References Cited

U.S. PATENT DOCUMENTS

| | | | |
|---|---|---|---|
| 8,108,255 B1* | 1/2012 | Robinson | G06Q 30/0631 |
| | | | 705/347 |
| 9,053,499 B1* | 6/2015 | Franson | G06F 16/24 |
| 9,460,458 B1* | 10/2016 | Dillard | G06Q 30/02 |
| 2011/0289455 A1* | 11/2011 | Reville | G06F 3/011 |
| | | | 715/830 |
| 2011/0289456 A1* | 11/2011 | Reville | G06F 3/017 |
| | | | 715/830 |
| 2013/0124449 A1* | 5/2013 | Pinckney | G06N 20/00 |
| | | | 706/52 |
| 2014/0160162 A1 | 6/2014 | Balachandreswaran et al. | |
| 2014/0298265 A1* | 10/2014 | Osmond | G06Q 30/0282 |
| | | | 715/835 |
| 2015/0193115 A1* | 7/2015 | Chirakan | G06F 3/04842 |
| | | | 715/810 |

FOREIGN PATENT DOCUMENTS

| | | |
|---|---|---|
| CN | 106250187 | 12/2016 |
| CN | 106527677 A | 3/2017 |
| CN | 109064284 A | 12/2018 |

OTHER PUBLICATIONS

International Search Report dated Mar. 23, 2020 for International Patent Application No. PCT/CN2019/127925.
The Second Office Action dated Oct. 28, 2023 regarding Chinese Application No. 201910018018.7.

\* cited by examiner

METHOD AND APPARATUS FOR ENTERING REVIEW INTERFACE

CROSS-REFERENCE TO RELATED APPLICATIONS

The present application is a continuation of International Application No. PCT/CN2019/127925, filed on Dec. 24, 2019, which claims priority to Chinese patent application No. 2019100180187, filed on Jan. 9, 2019. The disclosures of the aforementioned applications are hereby incorporated by reference in their entireties.

TECHNICAL FIELD

The embodiments of the present application relate to the technical field of augmented reality, and in particular, to a method and an apparatus for entering a review interface.

BACKGROUND

With the continuous development of the electronic commerce industry, an increasing number of users buy various products online, and there are more and more online shopping users and online products. After buying products online, users review the products online. Before buying a same product, other users determine whether to buy the product according to reviews of the product by the users having already bought the product. In general, the higher the reviews by the users having already bought the product are, the easier it is for the product to be bought by users intending to buy the product; on the contrary, if the users having already bought the product have low reviews on the product, it is hard for the product to be sold.

At present, users buy products through various applications (APP) of respective electronic commerce platforms, and after receiving a product, a user clicks an APP to enter an interface of my orders, and finds an order corresponding to the product, then, after clicking a button of confirm reception, continues to click a review button to enter a review interface. Then, the user reviews the product.

In the above-mentioned process of reviewing a product, the user needs to perform multiple operations before entering the review interface, and the process is complicated.

SUMMARY

The present application provides a method and an apparatus for entering a review interface, where the review interface is entered through an augmented reality scanning method, thereby achieving a purpose of entering the review interface rapidly.

In a first aspect, an embodiment of the present application provides a method for entering a review interface, and the method includes:

scanning, by a terminal device, a target object by using an augmented reality scanning method to acquire a first signal, where the first signal is used to trigger the terminal device to enter a review interface;

sending, by the terminal device, a first request message to a server according to the first signal, where the first request message is used to request the review interface;

receiving, by the terminal device, a first response message sent by the server, where the first response message carries data for generating the review interface; and generating and displaying, by the terminal device, the review interface according to the first response message.

In a possible design, the target object includes a target hand gesture, where the sending, by the terminal device, a first request message to a server according to the first signal includes:

determining, by the terminal device, whether a similarity between the target hand gesture corresponding to the first signal and a pre-stored hand gesture exceeds a preset threshold;

if the similarity between the target hand gesture corresponding to the first signal and the pre-stored hand gesture exceeds the preset threshold, sending, by the terminal device, a second request message to the server, to request an interface of a product to be reviewed, where the interface of the product to be reviewed includes a review control of at least one unreviewed product;

receiving, by the terminal device, a second response message sent by the server, where the second response message carries data for generating the interface of the product to be reviewed; and sending, by the terminal device, the first request message to the server according to a review control clicked by a user on the interface of the product to be reviewed, to request a review interface of the unreviewed product corresponding to the review control.

In a possible design, the target object includes a first product, and the first product is any one of products having been bought by a user, and the sending, by the terminal device, a first request message to a server according to the first signal includes:

sending, by the terminal device, the first request message carrying the first signal to the server, to cause the server to determine, according to the first signal, the first product from an order of the user and generating a review interface of the first product.

In a possible design, after generating and displaying, by the terminal device, the review interface according to the first response message, the method further includes:

acquiring, by the terminal device, a first picture through the review interface, where the first picture is a picture of the first product having been bought by the user;

generating, by the terminal device, according to an edit by the user to the first picture, a second picture carrying review information; and sending, by the terminal device, the second picture to the server.

In a possible design, the above-mentioned method further includes:

sending, by the terminal, a third request message to the server to request to acquire AR review information flows of a second product, where the second product is a product that is being browsed by a user through the terminal device;

receiving, by the terminal, the AR review information flows sent by the server, where the AR review information flows includes at least one type of review information, and attributes of respective types of AR review information at least include a number of review times and/or review intention; and displaying, by the terminal device, the AR review information flows according to the number of review times and/or the review intention of the respective types of AR review information.

In a possible design, after displaying, by the terminal device, according to the number of review times and/or the review intention of the respective types of AR review information, the AR review information flows, the method further includes:
  determining, by the terminal device, according to a click operation by the user, a first type of AR review information, where the first type of AR review information is an information flow in the AR review information flows which is clicked by the user through a touch screen of the terminal device; and
  displaying, by the terminal device, at least one piece of AR review information corresponding to the first type of AR review information.

In a second aspect, an embodiment of the present application provides a method for entering a review interface, including:
  receiving, by a server, a first request message sent by a terminal device, where the first request message is sent by the terminal device according to a first signal after the terminal device scans a target object through an augmented reality AR scanning method to acquire the first signal, where the first signal is used to trigger the terminal device to enter a review interface;
  generating, by the server, the review interface according to the first request message; and
  sending, by the server, a first response message to the terminal device, where the first response message carries data for generating the review interface.

In a possible design, the target object includes a target hand gesture, and before the receiving, by a server, a first request message sent by a terminal device, the method further includes:
  receiving, by the server, a second request message sent by the terminal device; and
  sending, by the server, a second response message to the terminal device, where the second response message carries data for generating an interface of a product to be reviewed, where the interface of the product to be reviewed includes a review control of at least one unreviewed product.

In a possible design, the target object includes a first product, and the first product is any one of products having been bought by a user, and the receiving, by a server, a first request message sent by a terminal device includes:
  receiving, by the server, the first request message carrying the first signal sent by the terminal device;
  the generating, by the server, the review interface according to the first request message includes:
  determining, by the server, a first product from an order of the user according to the first signal, and generating a review interface of the first product.

In a possible design, after the sending, by the server, a first response message, to the terminal device, the method further includes:
  receiving, by the server, a second picture carrying review information sent by the terminal device, where the second picture is obtained by editing, by the terminal device, a first picture.

In a possible design, the above-mentioned method further includes:
  receiving, by the server, a third request message sent by the terminal device, where the third request message is used to request to acquire AR review information flows of a second product, where the second product is a product that is being browsed by a user through the terminal device;
  acquiring, by the server, at least one piece of review information on the second product;
  processing, by the server, the at least one piece of review information to obtain the augmented reality AR review information flows; and
  sending, by the server, the AR review information flows to the terminal device.

In a possible design, the processing, by the server, the at least one piece of review information to obtain the augmented reality AR review information flows includes:
  extracting, by the server, at least one keyword from each piece of review information of the at least one piece of review information;
  filtering the at least one keyword to obtain emotional keywords;
  counting a number of review times for respective ones of the emotional keywords; and
  clustering the at least one piece of review information according to frequency and/or emotional intention, and obtain the AR review information flows according to a clustering result.

In a third aspect, an embodiment of the present application provides an apparatus for entering a review interface, including:
  a processing unit, configured to scan a target object by using an augmented reality AR scanning method to acquire a first signal, where the first signal is used to trigger a terminal device to enter a review interface;
  a sending unit, configured to send a first request message to a server according to the first signal, where the first request message is used to request the review interface;
  a receiving unit, configured to receive a first response message sent by the server, where the first response message carries data for generating the review interface; and
  a displaying unit, configured to display the review interface.

In a possible design, when the target object includes a target hand gesture, the processing unit is further configured to determine whether a similarity between the target hand gesture corresponding to the first signal and a pre-stored hand gesture exceeds a preset threshold;
  the sending unit, when the processing unit determines that the similarity between the target hand gesture corresponding to the first signal and the pre-stored hand gesture exceeds the preset threshold, sends a second request message to the server, to request an interface of a product to be reviewed, where the interface of the product to be reviewed includes a review control of at least one unreviewed product;
  the receiving unit is configured to receive a second response message sent by the server, where the second response message carries data for generating an interface of a product to be reviewed; and
  the sending unit is configured to send the first request message to the server according to a review control clicked by a user on the interface of the product to be reviewed, to request a review interface of the unreviewed product corresponding to the review control.

In a possible design, when the target object includes a first product, the sending unit sends the first request message carrying the first signal to the server, to cause the server to determine, according to the first signal, the first product from an order of a user and generate a review interface of the first product.

In a possible design, the processing unit is further configured to acquire, after the display unit displays the review interface, a first picture through the review interface, where the first picture is a picture of the first product having been bought by a user; and generate, according to an edit to the first picture by the user, a second picture carrying review information;

the sending unit is further configured to send the second picture to the server.

In a possible design, the sending unit is further configured to send a third request message to the server to request to acquire AR review information flows of a second product, where the second product is a product that is being browsed by a user through the terminal device;

the receiving unit is further configured to receive the AR review information flows sent by the server, where the AR review information flows includes at least one type of review information, and attributes of respective types of the AR review information at least include a number of review times and/or review intention; and the displaying unit is further configured to display, according to the number of review times and/or the review intention of the respective types of AR review information, the AR review information flows.

In a possible design, the processing unit is further configured to determine, after the displaying unit displays the AR review information flows according to the number of review times and/or the review intention of the respective types of AR review information, a first type of AR review information according to a click operation by the user, where the first type of AR review information is an information flow in the AR review information flows which is clicked by the user through a touch screen of the terminal device;

the displaying unit is further configured to display at least one piece of AR review information corresponding to the first type of AR review information.

In a fourth aspect, an embodiment of the present application provides an apparatus for entering a review interface, including:

a receiving unit, configured to receive a first request message sent by a terminal device, where the first request message is sent by the terminal device according to the first signal after the terminal device scans a target object through an augmented reality AR scanning method to acquire a first signal, where the first signal is used to trigger the terminal device to enter a review interface;

a processing unit, configured to generate the review interface according to the first request message; and a sending unit, configured to send a first response message to the terminal device, where the first response message carries data for generating the review interface.

In a possible design, when the target object includes a target hand gesture, the receiving unit is further configured to receive, before receiving the first request message sent by the terminal device, a second request message sent by the terminal device;

the sending unit is further configured to send a second response message to the terminal device, where the second response message carries data for generating an interface of a product to be reviewed, where the interface of the product to be reviewed includes a review control of at least one unreviewed product.

In a possible design, when the target object includes a first product, and the first product is any one of products having been bought by a user, the receiving unit receives the first request message carrying the first signal sent by the terminal device;

the processing unit is configured to determine a first product from an order of the user according to the first signal, and generate the review interface of the first product.

In a possible design, the receiving unit is further configured to receive, after the sending unit sends the first response message to the terminal device, a second picture carrying review information sent by the terminal device, where the second picture is obtained by editing, by the terminal device, a first picture.

In a possible design, the receiving unit is further configured to receive a third request message sent by the terminal device, where the third request message is used to request to acquire AR review information flows of a second product, where the second product is a product that is being browsed by a user through the terminal device;

the processing unit is further configured to acquire at least one piece of review information on the second product, and process the at least one piece of review information, to acquire the augmented reality AR review information flows; and the sending unit is further configured to send the AR review information flows to the terminal device.

In a possible design, when processing the at least one piece of review information to obtain the augmented reality AR review information flows, the processing unit extracts at least one keyword from each piece of review information in the at least one piece of review information; filters the at least one keyword to obtain emotional keywords; counts a number of review times for respective ones of the emotional keywords; clusters the at least one piece of review information according to frequency and/or emotional intention to obtain the AR review information flows according to a clustering result.

In a fifth aspect, an embodiment of the present application provides a terminal device, including a processor, a memory and a computer program stored on the memory and executable on the processor, where, when the processor executes the program, the method as described in the above-mentioned first aspect or in the respective possible implementations of the first aspect is implemented.

In a sixth aspect, an embodiment of the present application provides a server, including a processor, a memory and a computer program stored on the memory and executable on the processor, where, when the processor executes the program, the method as described in the above-mentioned first aspect or in the respective possible implementations of the first aspect is implemented.

In a seventh aspect, an embodiment of the present application provides a storage medium, where the storage medium has instructions stored therein, and when the instructions are running on a computer, the instructions cause the computer to execute the method as described in the above-mentioned first aspect or in the respective possible implementations of the first aspect.

In an eighth aspect, an embodiment of the present application provides a storage medium, where the storage medium has instructions thereon, and when the instructions are running on a computer, the instructions cause the computer to execute the method as described in the above-mentioned second aspect or in the respective possible implementations of the second aspect.

In a ninth aspect, an embodiment of the present application provides a computer program product, and when the computer program product is running on a computer, the computer program product causes the computer to execute the method as described in the above-mentioned first aspect or in the respective possible implementations of the first aspect.

In a tenth aspect, an embodiment of the present application provides a computer program product, and when the computer program product is running on a computer, the computer program product causes the computer to execute the method as described in the above-mentioned second aspect or in the respective possible implementations of the second aspect.

In the method and apparatus for entering a review interface provided by the embodiments of the present application, a terminal device scans a target object through an AR scanning method to obtain a first signal, sends a first request message to a server according to the first signal to request a review interface, and after receiving the first request message, the server sends a first response message carrying data for generating an interface of a product to be reviewed to the terminal device. In the process, after the terminal device enters a web page of an electronic commerce platform, a review interface can be entered by AR scanning, thereby achieving a purpose of entering the review interface rapidly. At the same time, the method for entering a review interface is interesting, which makes users interested in entering the review interface to review the product having been bought, and thus makes the electronic commerce platform be able to acquire as much review information as possible to display to other users, increasing the sales of the product.

BRIEF DESCRIPTION OF DRAWINGS

To illustrate technical solutions in the embodiments of the present application of in the prior art more clearly, the following will briefly describe drawings that need to be used in descriptions of the embodiments or prior arts. Apparently, the following drawings described are some embodiments of the present application, and for those have ordinary skills in the art, other drawings may be obtained according to the drawings without making creative efforts.

DETAILED DESCRIPTION

To make purposes, technical solutions and advantages of the embodiments of the present application clearer, the following will describe the technical solutions in the embodiments of the present application clearly and comprehensively with reference to the accompanying drawings in the embodiments of the present application. Apparently, the embodiments described are part of embodiments of the present application, but not all embodiments. Based on the embodiments of the present application, other embodiments obtained by those of ordinary skills in the art without paying creative efforts are all belong to the protection scope of the present application.

At present, users buy products through various applications (APP) of respective electronic commerce platforms. After receiving a product, a user clicks an APP to enter an interface of my orders, finds an order corresponding to the product, clicks a button of confirm reception, and then clicks a review button to enter a review interface. Then, the user reviews the product. In the review process, a user needs to perform at least the following operations:

S1, click an APP of an electronic commerce platform;
S2, enter an interface of "My orders" in a state of logged in;
S3, click a button of "To be reviewed" in the interface of "My orders" to enter an interface of unreviewed products;
S4, select one or more products to be reviewed from the interface of the unreviewed products;
S5, click a product to be reviewed to enter a review interface to review the product to be reviewed.

In the above reviewing process, the user needs to perform at least 5 steps of operations before entering the review interface, the process is cumbersome and the steps are complicated, which leads to that many users will not review products after buying the products, making the electronic commerce platform cannot acquire as much review information about the products as possible. When a user intending to buy a product is browsing the product on the electronic commerce platform, as there is no or little review information of the product, an illusion that the product is not popular will be made to the user, resulting in a decrease in the sales of the product.

In view of this, an embodiment of the present application provides a method for entering a review interface, the review interface can be entered rapidly by scanning a target object, and entering the review interface is made more interesting to users, which makes the users enter the review interface rapidly to review the products having been bought, and thereby makes the electronic commerce platform be able to obtain as much review information of the products as possible and display the review information to other users, thus increasing the sales of the products. Illustratively, referring to FIG. 1.

Figure 1:
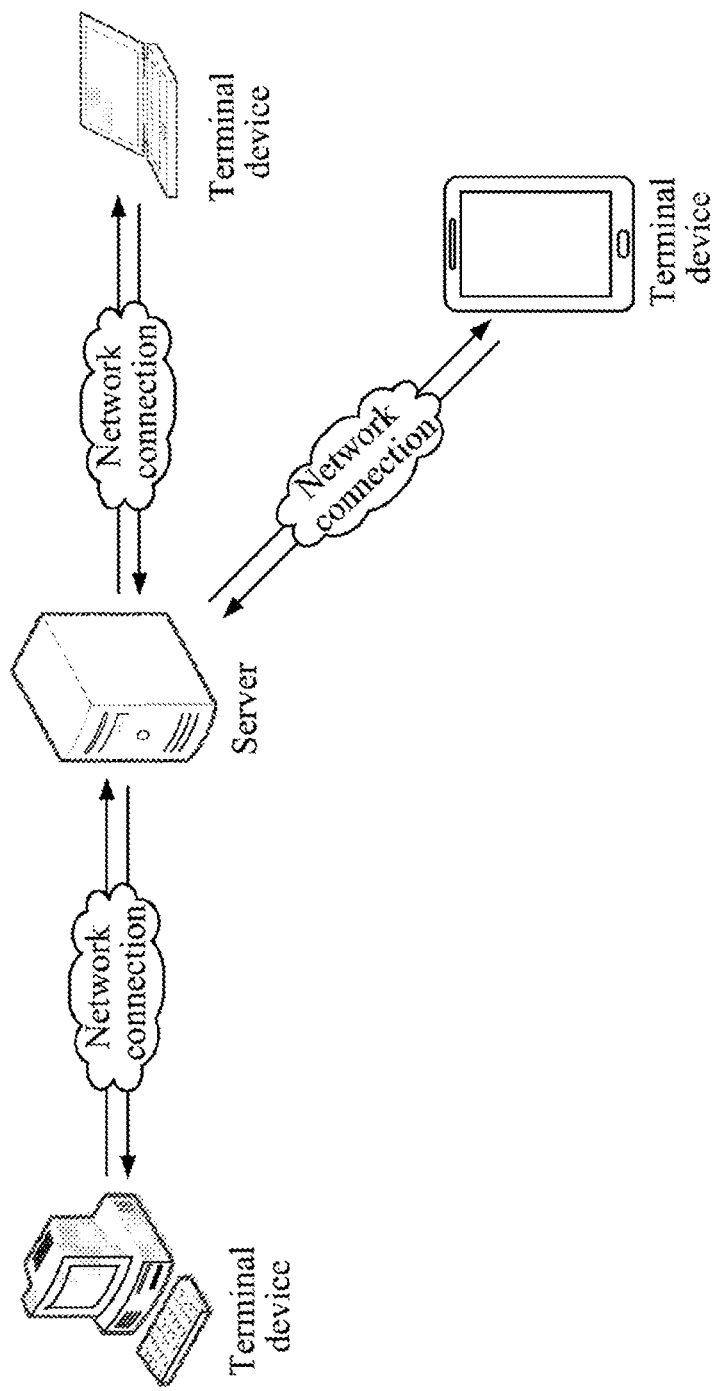
FIG. 1 is a schematic diagram of an application scenario of a method for entering a review interface provided by an embodiment of the present application.

FIG. 1 is a schematic diagram of an application scenario of a method for entering a review interface provided by an embodiment of the present application. Referring to FIG. 1, a terminal device establishes a network connection with a server, the terminal device scans a target object through an augmented reality (AR) method to obtain a first signal, the terminal device sends a first request message to the server according to the first signal to request the server to push a review interface. The server sends a first response message which carries data used to generating an interface of products to be reviewed to the terminal device, and after receiving the first response message, the terminal device displays the review interface to a user, where the terminal device may be, for example, a computer, a laptop, a mobile phone, etc., of the user, which is not limited by the embodiment of the present application. The server may be, for example, servers of respective electronic commerce platforms, such as a server of JD.com, a server of TMall, a server of Vipshop, and the like.

In the following, a method for entering a review interface described in the embodiment of the present application will described in detail on the basis of FIG. 1. Illustratively, referring to FIG. 2.

Figure 2:
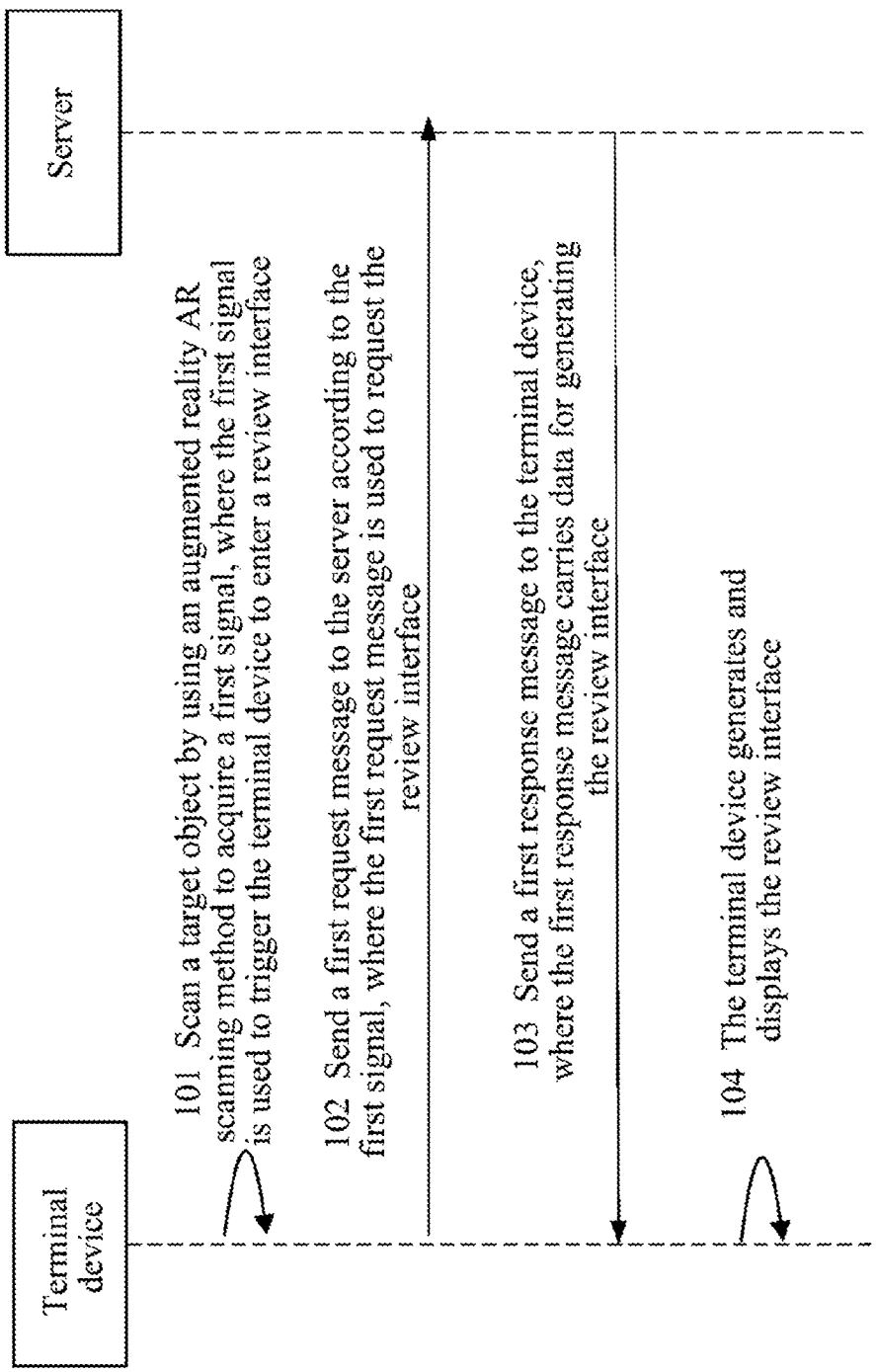
FIG. 2 is a flowchart of a method for entering a review interface provided by an embodiment of the present application.

FIG. 2 is a flowchart of a method for entering a review interface provided by the embodiment of the present application. The embodiment describes the method for entering a review interface provided by the embodiment of the present application in detail from a perspective of interactions between a server and a terminal device, and the embodiment includes:

101, a terminal device scans a target object by using an augmented reality AR scanning method to acquire a first signal, where the first signal is used to trigger the terminal device to enter a review interface.

In the step, the terminal device scans a target object by using an AR scanning method to acquire a first signal, where the first signal is used to trigger the terminal device to enter a review interface, where the target object may be a product that has been bought by a user, a target hand gesture of a user, etc. For example, a user clicks an APP of an electronic commerce platform on the terminal device to enter a front page of the electronic commerce platform, clicks a "Scan" control on the front page to enter a scanning interface, and selects "AR" scanning in the scanning interface to scan the target object.

102, the terminal device sends a first request message to a server according to the first signal, where the first request message is used to request the review interface.

Correspondingly, the server receives the first request message used to request the review interface.

In the step, the terminal device sends the first request message to the server according to the first signal. For example, when the target object is a product having been bought, the first signal may be an image signal of the product having been bought, and the terminal device sends the first request message carrying the first signal to the server. For another example, when the target object is a target hand gesture, the target device determines whether a similarity between the target hand gesture and a pre-stored hand gesture is greater than a first threshold, and if so, sends the first request message to the server.

103, the server sends a first response message to the terminal device, where the first response message carries data for generating the review interface.

In the step, the server sends a first response message carrying data used to generate an interface of a product to be reviewed to the terminal device, to enable the terminal device to display the review interface to the user.

104, the terminal device generates and displays the review interface according to the first response message.

In the method for entering a review interface provided by the embodiment of the present application, a terminal device scans a target object through an AR scanning method to obtain a first signal, sends a first request message to a server according to the first signal to request a review interface, and after receiving the first request message, the server sends a first response message carrying data used to generate an interface of a product to be reviewed to the terminal device. In the process, after the terminal device enters a web page of an electronic commerce platform, a review interface can be entered by AR scanning, thereby achieving a purpose of entering the review interface rapidly. At the same time, the method for entering a review interface is interesting, which makes a user interested in entering the review interface to review a product that has been bought, thereby making the electronic commerce platform acquire as much review information as possible and display to other users, increasing the sales of the product.

The following describes how the terminal device scans the target object so as to enter the review interface rapidly in detail. Illustratively, referring to FIG. 3 and FIG. 5.

Figure 3:
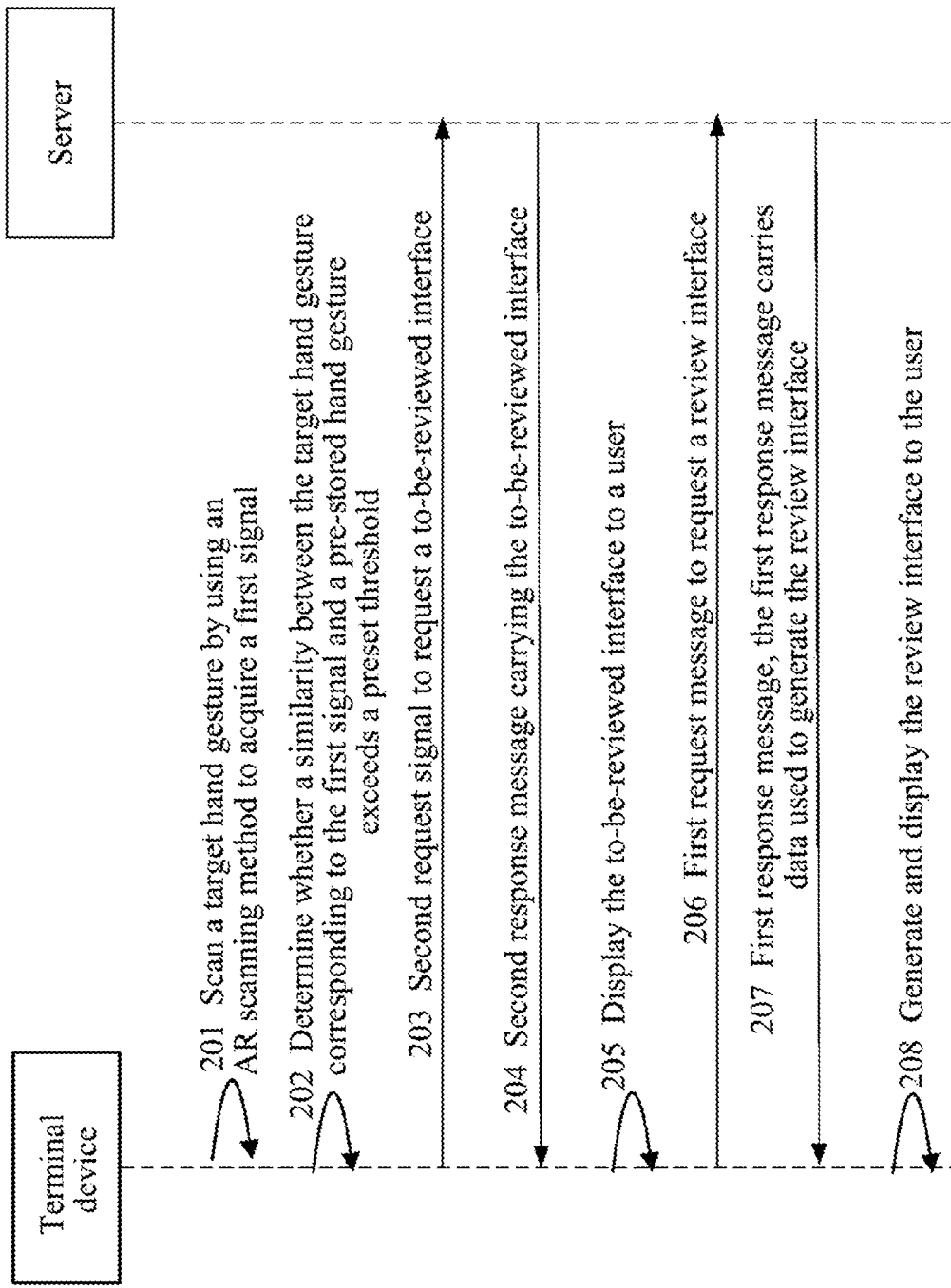
FIG. 3 is a flowchart of another method for entering a review interface provided by an embodiment of the present application.

FIG. 3 is a flowchart of another method for entering a review interface provided by the embodiment of the present application. In the present embodiment, the target object is specifically a target hand gesture, the embodiment describes the method for entering a review interface provided by the embodiment of the present application in detail from a perspective of interactions between a server and a terminal device, and the embodiment includes:

201, a terminal device scans a target hand gesture through an AR scanning method to acquire a first signal.

In the embodiment of the present application, the target hand gesture may be preset by a user, or preset by an electronic commerce platform. For example, a hand gesture of "V", a hand gesture of "OK", etc. Illustratively, reference is made to FIG. 4A to FIG. 4F, which is a schematic diagram of scanning a target hand gesture in a method for entering a review interface provided by an embodiment of the present application.

As shown in FIG. 4A to FIG. 4D, assuming that the target hand gesture is to raise an index finger, the user first clicks an APP of an electronic commerce platform (shown as "EC" in FIG. 4A) on the terminal device to enter a front page of the electronic commerce platform, then clicks a "Scan" control and selects "AR" scanning, and then scans the target hand gesture by using the AR scanning method to acquire the first signal.

202, the terminal device determines whether a similarity between the target hand gesture corresponding to the first signal and a pre-stored hand gesture exceeds a preset threshold, and if the similarity exceeds the preset threshold, executes 203, otherwise, returns to S201.

203, the terminal device sends a second request message to the server.

Correspondingly, the server receives the second request message.

In the step, if the similarity between the target hand gesture corresponding to the first signal and the pre-stored hand gesture exceeds the preset threshold, the terminal device sends a second request message to the server, to request an interface of a product to be reviewed, where the interface of the product to be reviewed includes a review control of at least one unreviewed product.

204, the server sends a second response message to the terminal device.

Correspondingly, the terminal device receives the second response message.

The second response message carries data used to generate the interface of the product to be reviewed, and the interface of the product to be reviewed includes a review control of at least one unreviewed product.

205, the terminal device displays the interface of the product to be reviewed to the user.

Figures 4A, 4B, 4C:
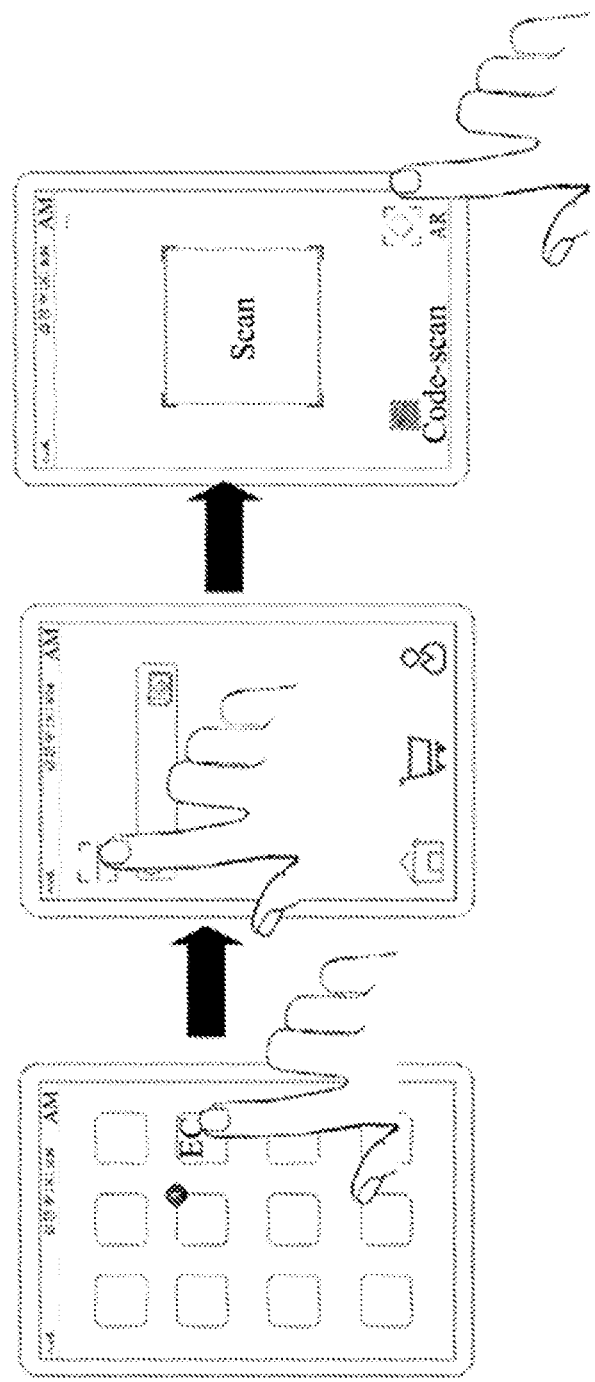
FIG. 4A to FIG. 4F are schematic diagrams of scanning a target hand gesture in a method for entering a review interface provided by an embodiment of the present application.
Figures 4D, 4E, 4F:
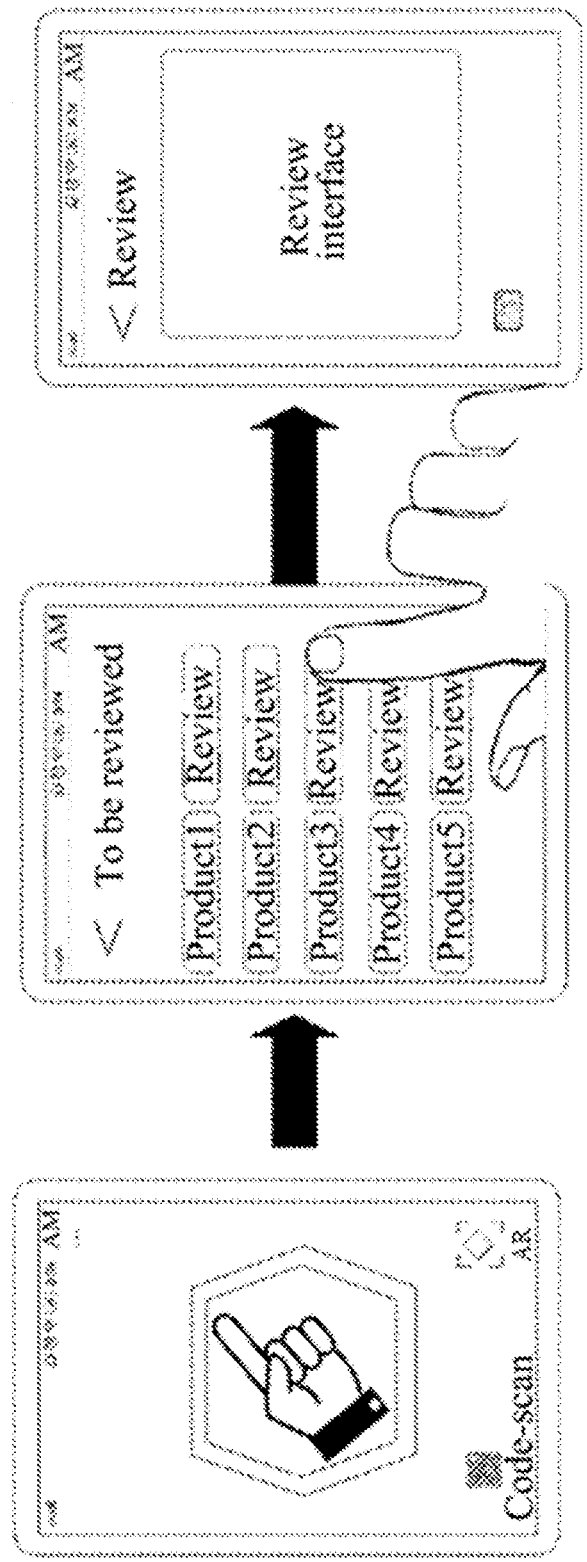

As shown in FIG. 4E, the terminal device generates the interface of the product to be reviewed according to a second response message, and displays the interface of the product to be reviewed to the user, there is at least one product that has been bought by the user included in the interface of the product to be reviewed. For example, as shown in FIG. 4E, there are 5 products to be reviewed. Each product to be reviewed corresponds to one review control.

206, the terminal device sends a first request message to the server.

Correspondingly, the server receives the first request message.

In the step, the terminal device sends a first request message to the server according to a review control clicked by a user on the interface of the product to be reviewed, to request the review interface of the unreviewed product corresponding to the review control.

Referring to FIG. 4E, the user clicks a review space corresponding to product 3, and then, the terminal device sends the first request message to the server, to request to acquire the review interface of the product 3.

207, the server sends a first response message to the terminal device, where the first response message carries data used to generate the interface of the product to be reviewed.

Correspondingly, the terminal device receives the first response message.

208, the terminal device displays the review interface to the user.

Referring the FIG. 4F, the terminal device generates and displays the review interface of the product 3 according to the first response message.

In the present embodiment, the terminal device realizes rapid entry to the review interface through scanning the target hand gesture, which makes users interested in entering the review interface to review the product that has been bought, thereby making the electronic commerce platform acquire as much review information as possible to display to other users, increasing the sales of the product.

Figure 5:
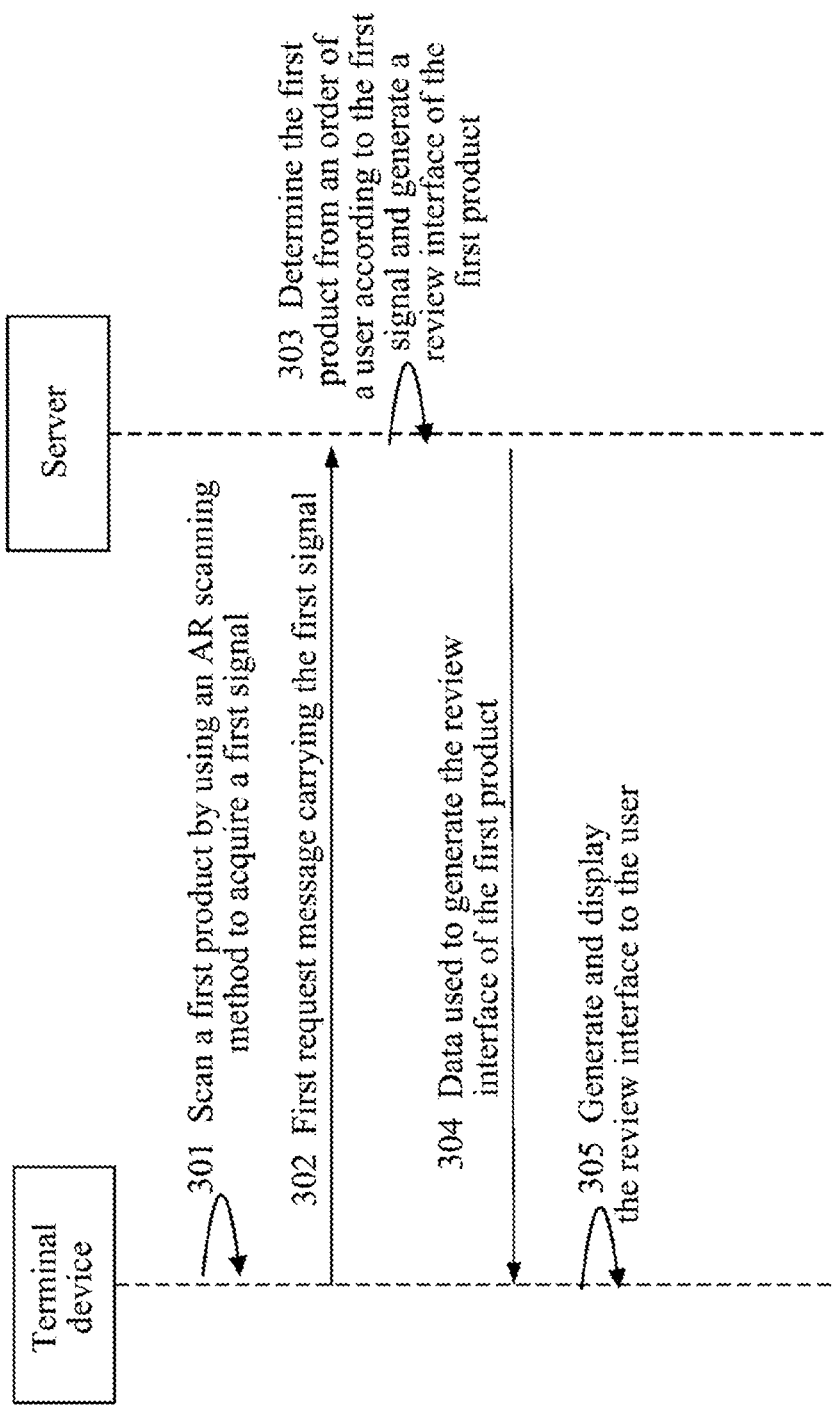
FIG. 5 is a flowchart of still another method for entering a review interface provided by an embodiment of the present application.

FIG. 5 is a flowchart of still another method for entering a review interface provided by an embodiment of the present application. In the present embodiment, the target object is specifically a first product, and the first product is any one of products that a user has bought. The embodiment describes the method for entering a review interface provided by the embodiment of the present application in detail from a perspective of interactions between a server and a terminal device, and the embodiment includes:

301, a terminal device scans a first product through an AR scanning method to acquire a first signal.

In the embodiment of the present application, the first product may be any one of products that a user has bought. Illustratively, reference is made to FIG. 6A to FIG. 6E, which is a schematic diagram of scanning a first product in a method for entering a review interface provided by an embodiment of the present application.

As shown in FIG. 6A to FIG. 6D, assuming that the first product is a hand bag, the user first clicks an APP of an electronic commerce platform (shown as "EC" in FIG. 6A) on the terminal device to enter a front page of the electronic commerce platform, then clicks a "Scan" control and selects "AR" scanning, and then scans the first product by using the AR scanning method to acquire the first signal.

302, the terminal device sends a first request message carrying the first signal to the server.

Correspondingly, the terminal device receives the first request message carrying the first signal, where the first signal is, for example, an image signal of the first product, etc.

303, the server determines a first product from an order of a user according to the first signal, and generates a review interface of the first product.

In the step, the server determines the first product from an order of a user, i.e., products that have been bought by the user, according to the first signal.

304, the server sends data used to generate the review interface of the first product to the terminal device.

In the step, the server sends the review interface of the first product to the terminal device according to the first response message, etc.

305, the terminal device generates and displays the review interface to the user.

Figures 6A, 6B, 6C:
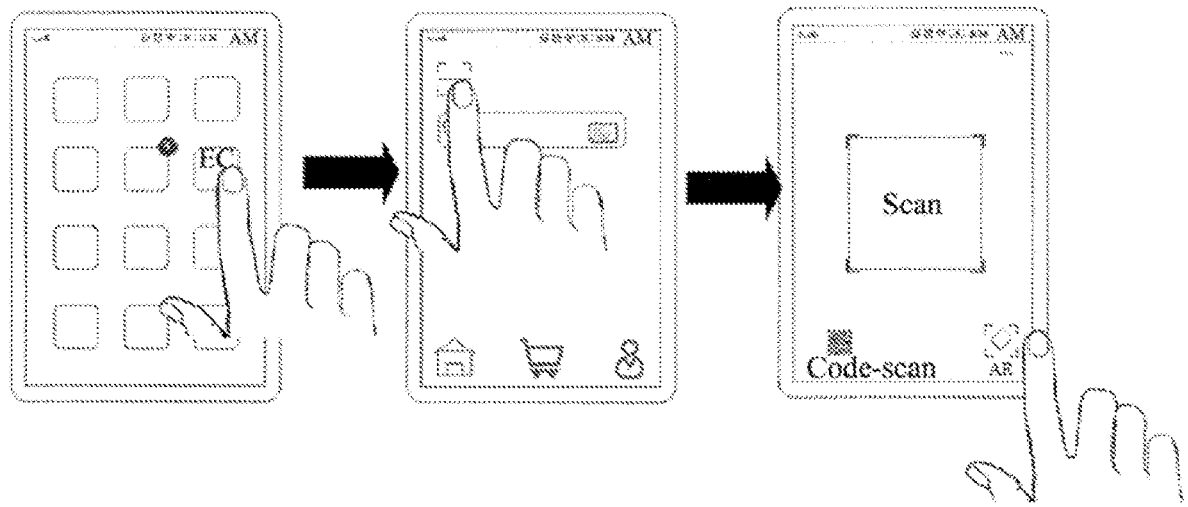
FIG. 6A to FIG. 6E are schematic diagrams of scanning a first product in a method for entering a review interface provided by an embodiment of the present application.
Figures 6D, 6E:
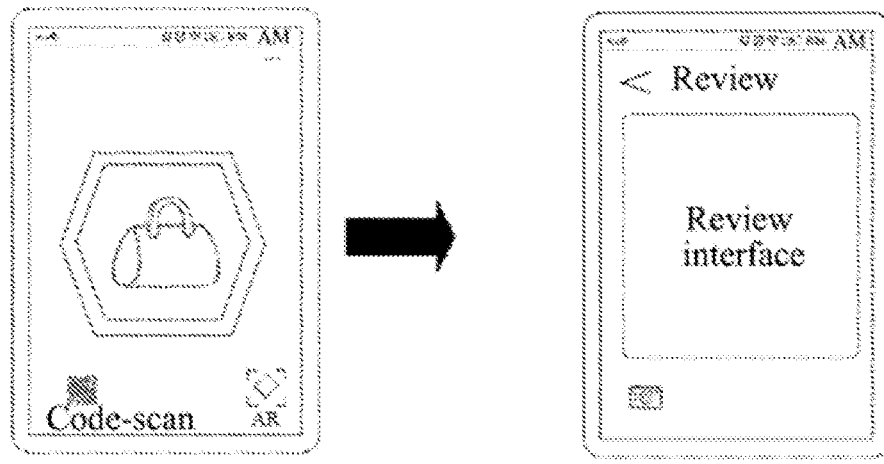

Referring the FIG. 6E, the terminal device displays the review interface of the first product.

In the present embodiment, the terminal device realizes rapid entry to the review interface through scanning the first product, which makes users interested in entering the review interface to review the bought products, thereby making the electronic commerce platform acquire as much review information as possible to display to other users, increasing the sales of the product.

In the above-mentioned respective embodiments, after the terminal device displays the review interface to the user, the user can review the first product through a spliced interface, and then, the terminal device sends the user's review information on the first product to the server. The following describes how the terminal device reviews the first product through the review interface in detail.

In a possible design, after generating and displaying the review interface according to the first response message, the terminal device further acquires a first picture through the review interface, where the first picture is a picture of the first product that has been bought by the user; the terminal device generates a second picture carrying the review information according to an edit to the first picture by the user; and the terminal device sends the second picture to the server.

Illustratively, the user may use stars to review the first product, the logistics and the service through the review interface. In addition, the user may also post a picture or a video of the first product, or may provide a text description of the first product. In the process of posting a picture, the first picture of the first product is acquired, and the first picture is displayed to the user in an editable form, to enable the user to edit by inputting texts, circling key parts, scrawling, etc., then the terminal merges contents edited by the user and the first picture to generate the second picture and send the second picture to the server, or save the second picture in a data base for the server to acquire the second picture from the data base.

In the present embodiment, the first picture of the first product is displayed in the editable form, so that the user can edit the first picture, and then input review information and the like on the first picture, which makes the posting of pictures more referential and interesting, and makes the user interested in entering the review interface to review the bought product, thereby making the electronic commerce platform acquire as much review information as possible to display to other users, increasing the sales of the product.

In the above embodiments, how the user enters the review interface rapidly is described in detail. The following illustrates in detail how the server mines review information of a same product from multiple users to acquire AR review information flows, and how the terminal device views the AR review information flows to determine whether to buy the product. Illustratively, referring to FIG. 7.

Figure 7:
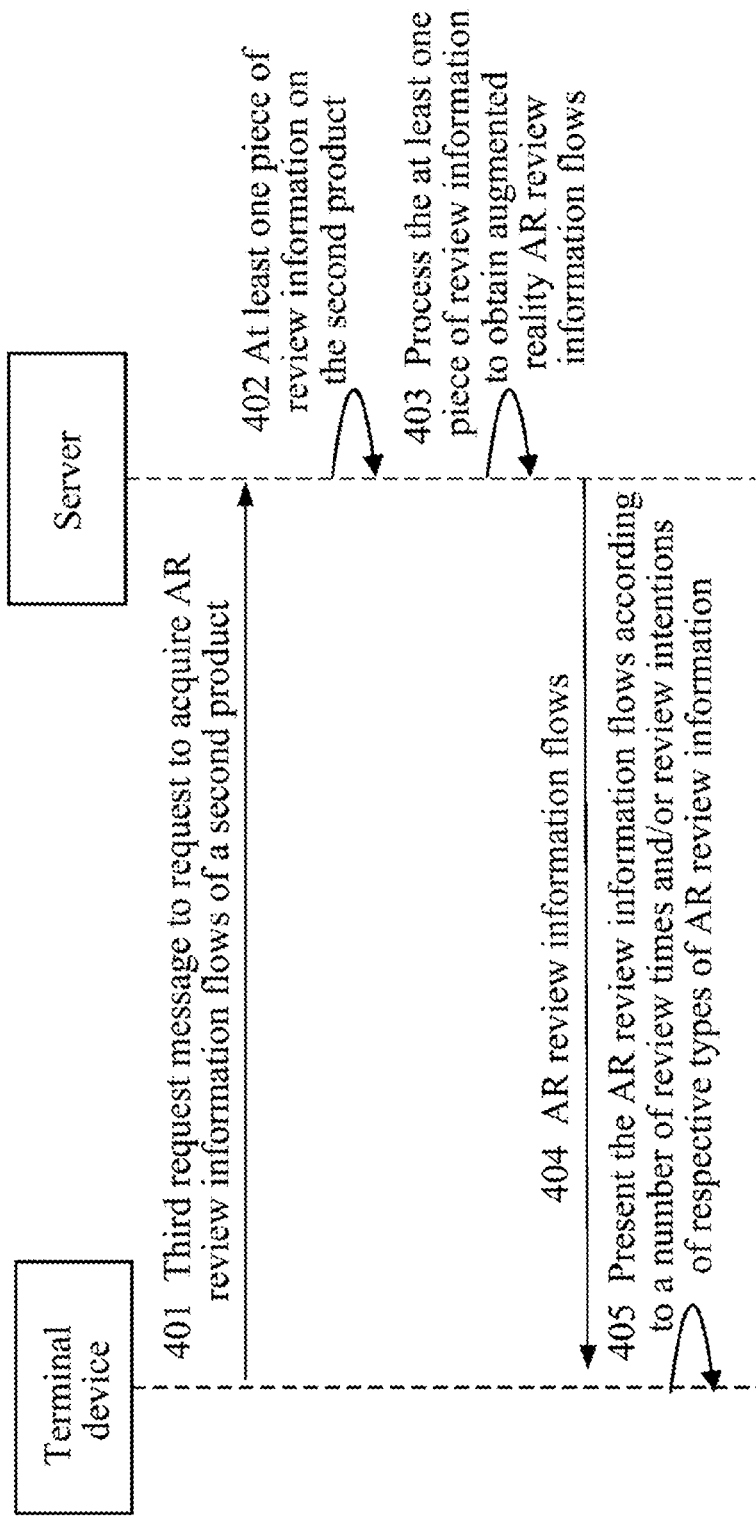
FIG. 7 is a flowchart of acquiring review information provided by an embodiment of the present application.

FIG. 7 is a flowchart of acquiring review information provided by an embodiment of the present application. The embodiments include:

401, a terminal device sends a third request message to a server.

In the step, when a user browses a second product on an electrical commerce platform through a terminal device, the terminal device is triggered to send a third request message to a server, to request to acquire AR review information flows of the second product; correspondingly, the server receives the third request message.

402, the server acquires at least one piece of review information on the second product.

In the step, the server acquires multiple pieces of review information of the second product from multiple users. For example, after users who bought the second product review the second product, the review information is sent to the server, so that the server can acquire multiple pieces of review information on the second product; for another example, after users who bought the second product review the second product, the review information is sent to a data base, so that the server can acquire the review information on the second product from multiple users from the data base.

403, the server processes the at least one piece of review information to obtain augmented reality AR review information flows.

In the step, the server gathers multiple pieces of review information on the second product, mines the gathered review information, etc., to obtain AR review information flows of the second product.

404, the server sends the AR review information flows to the terminal device.

Correspondingly, the terminal device receives the AR review information flows. The AR review information flows include at least one type of AR review information, and attributes of respective types of AR review information at least include a number of review times and/or review intention.

405, the terminal device displays the AR review information flows according to the number of review times and/or review intention of respective types of AR review information.

In the present embodiment, after gathering review information of the same second product from multiple users, the server obtains the AR review information flows according to the review information by text mining, etc., and sends the AR review information flows to the terminal device, so that the terminal device displays the AR review information flows to the user, and thereby the user can acquire the review information of the second product rapidly.

The following illustrates how the server acquires the AR review information flows according to multiple pieces of AR review information in detail.

In a possible implement, when processing the at least one piece of review information to obtain the augmented reality AR review information flows, the server extracts at least one keyword from each piece of review information of the at least one piece of review information; filters the at least one keyword to obtain emotional keywords; counts a number of review times for respective ones of the emotional keywords; clusters the at least one piece of review information according to frequency and/or emotional intention, and obtain the AR review information flows according to a clustering result. For the terminal device, after receiving the AR review information flows, the terminal device displays the AR review information flows according to the number of review times and/or review intention of the respective types of AR review information, then determines a first type of AR review information according to a click operation by the user, where the first type of AR review information is an information flow of the AR review information flows which is clicked by the user through a touch screen of the terminal device, and the terminal device displays at least one piece of AR review information corresponding to the first type of AR review information.

Figure 8:
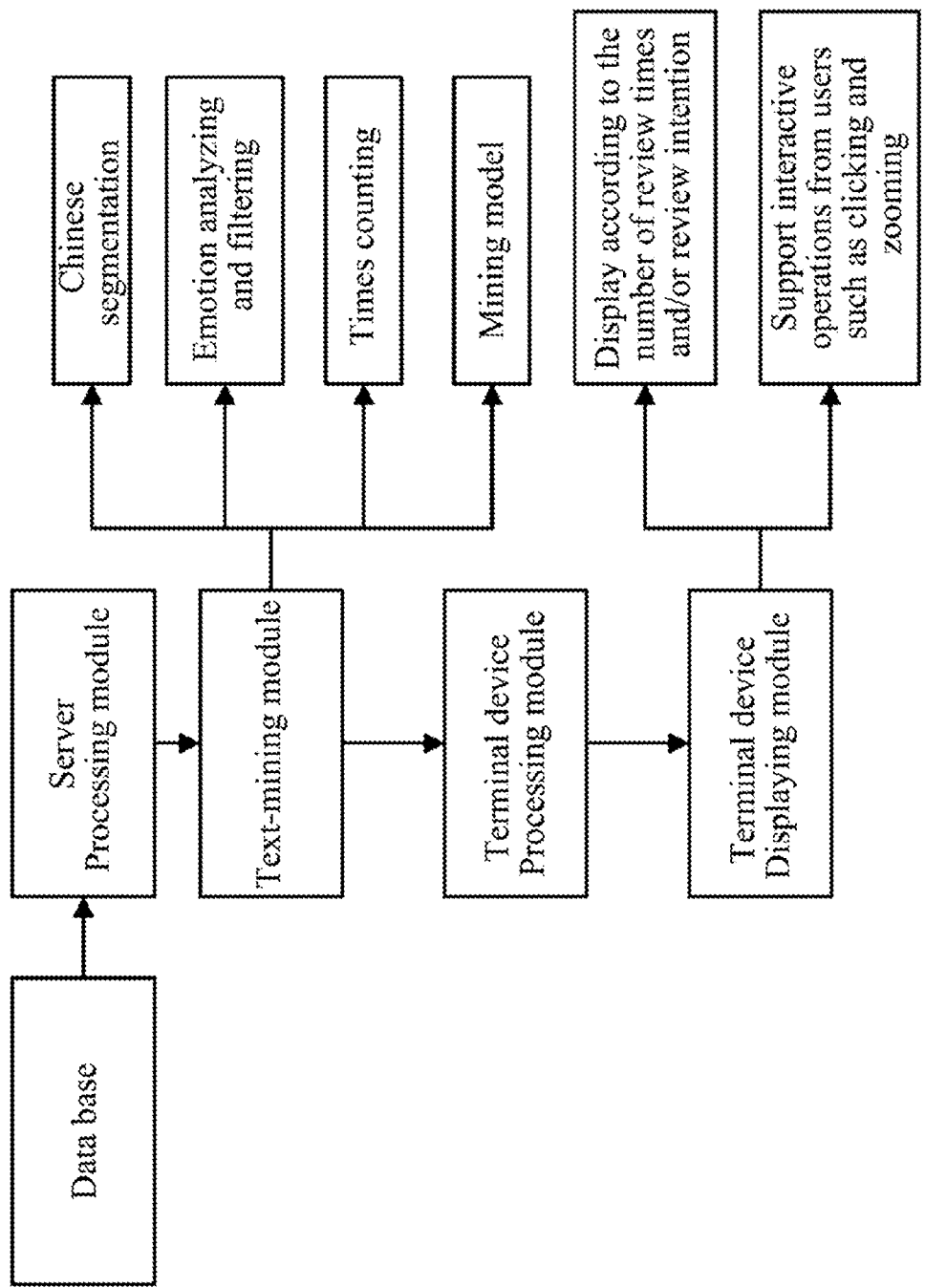
FIG. 8 is a schematic diagram of a generating and displaying process of AR review information flows in a method for entering a review interface provided by an embodiment of the present application.

Illustratively, referring to FIG. 8, FIG. 8 is a schematic diagram of a generating and displaying process of AR review information flows in a method for entering a review interface provided by an embodiment of the present application. Referring to FIG. 8, after a processing module of the server acquires multiple pieces of review information, the multiple pieces of review information are processed by a text-mining module, where the processing includes extracting a keyword from the review information by text-segmentation, filtering the review information by emotion analyzing and, clustering the review information by a review-time counting module and a mining model to obtain the AR review information flows, and the AR review information flows are sent to the terminal device. After the processing module of the terminal device receives the AR review information flows, the AR review information flows are displayed according to dimensions of the number of review times and/or the review intention, etc. The AR review information flows can be divided into multiple types according to the number of review times and/or the review intention, each type of AR review information supports operations of clicking and zooming, the multiple types of review information can be extended level by level, and the review information created by the user is finally represented, so that the user intending to buy the second product can feel the reviews of the second product from users that have already bought the second product with an immersive vision experience.

The following will illustrate the AR review information flows and the first type of AR review information in the AR review information flows in the above embodiment in detail. Illustratively, referring to FIG. 9A and FIG. 9B.

Figures 9A, 9B:
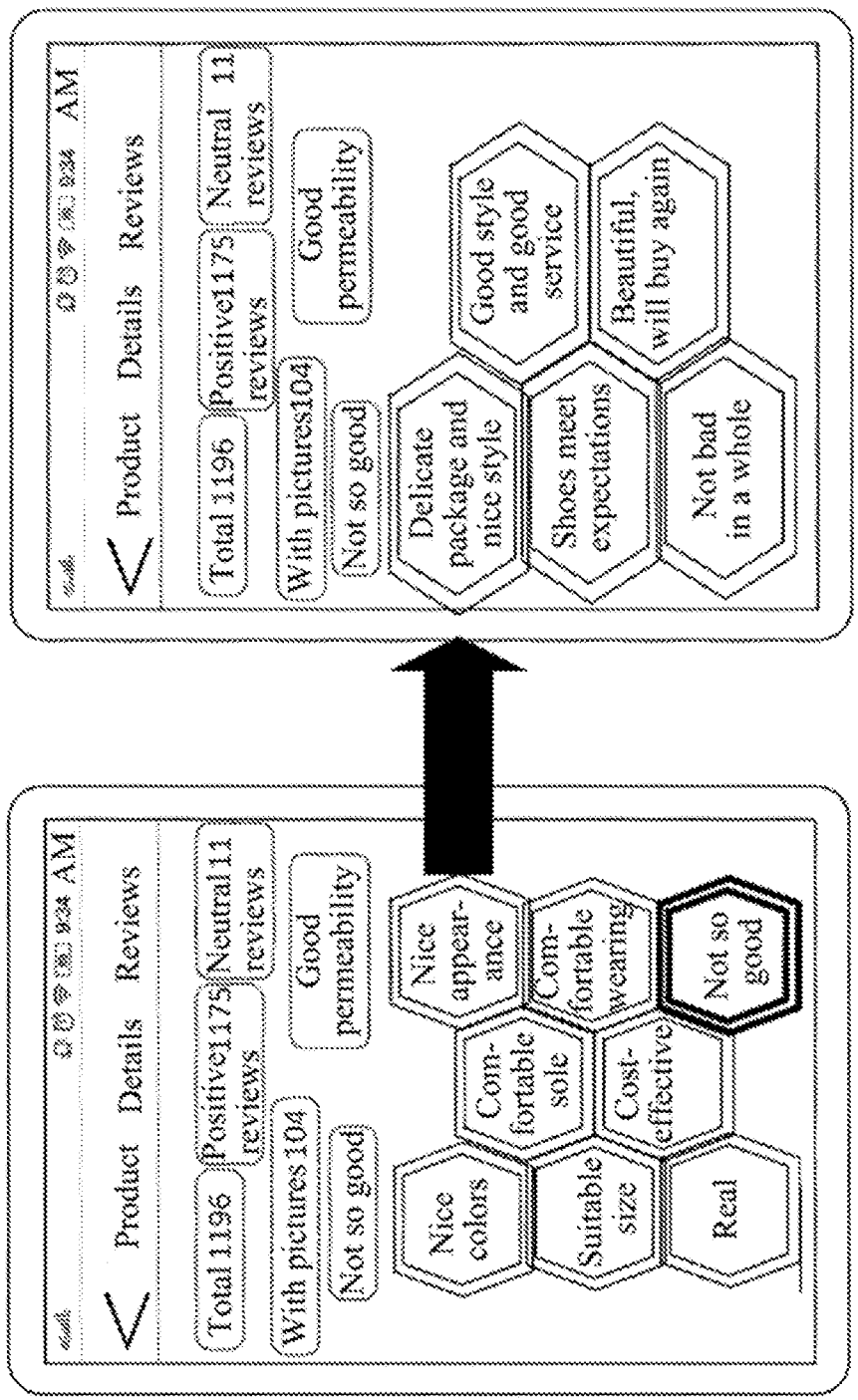
FIG. 9A to FIG. 9B are example schematic diagrams of AR review information flows in a method for entering AR review information provided by an embodiment of the present application.

FIG. 9A and FIG. 9B are example schematic diagrams of AR review information flows in a method for entering AR review information provided by an embodiment of the present application. Referring to FIG. 9A, inside rectangular blocks are regular reviews, inside hexagonal blocks are AR review information flows, each hexagonal block represents one type of AR review information, and each type of AR review information has attributes of a number of review times and/or review intentions, etc. In general cases, AR review information with a larger number of review times will be displayed with priority, and AR review information with different review intentions may be distinguished by colors, shapes, etc., so that the user understands the review information flows at a glance. As shown in FIG. 9A, "Not so good", the emotional intention of the review information highlighted with a black frame is apparently different from other types of AR review information. In the AR review information flows, the user can click any type of the AR review information to unfold the type of AR review information. For example, by clicking "Nice appearance", an interface shown in FIG. 9B is obtained, and the user can continue to perform operations such as clicking to FIG. 9B.

It should be noted that, in the present embodiment, the AR review information flows are presented to the users in hexagons, however, it is not limited by the embodiments of the present application, and the AR review information flows may be presented to users by other methods.

Figure 10:
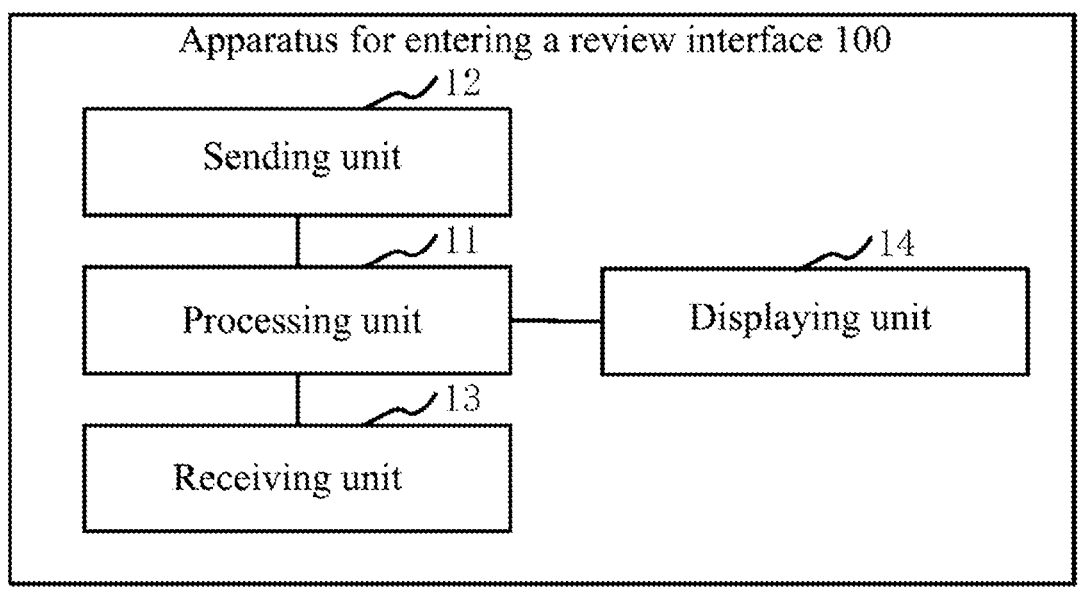
FIG. 10 is a schematic structural diagram of an apparatus for entering a review interface provided by an embodiment of the present application.

FIG. 10 is a schematic structural diagram of an apparatus for entering a review interface provided by an embodiment of the present application. The apparatus for entering a review interface involved in the present embodiment may be a terminal device, or may be a chip applied to the terminal device. The apparatus for entering a review interface may be configured to execute functions of the terminal device in the above embodiments. As shown in FIG. 10, the apparatus for entering a review interface 100 may include:

a processing unit 11, configured to scan a target object by using an augmented reality AR scanning method to acquire a first signal, where the first signal is used to trigger a terminal device to enter a review interface;

a sending unit 12, configured to send a first request message to a server according to the first signal, where the first request message is used to request the review interface;

a receiving unit 13, configured to receive a first response message sent by the server, where the first response message carries data for generating the review interface; and a displaying unit 14, configured to display the review interface.

In a possible design, when the target object includes a target hand gesture, the processing unit 11 is further configured to determine whether a similarity between the target hand gesture corresponding to the first signal and a pre-stored hand gesture exceeds a preset threshold;

the sending unit 12, when the processing unit 11 determines that the similarity between the target hand gesture corresponding to the first signal and the pre-stored hand gesture exceeds the preset threshold, sends a second request message to the server, to request an interface of a product to be reviewed, where the interface of the product to be reviewed includes a review control of at least one unreviewed product;

the receiving unit 13 is configured to receive a second response message sent by the server 13, where the second response message carries data for generating the interface of the product to be reviewed;

the sending unit 12 is configured to send the first request message to the server according to a review control clicked by a user on the interface of the product to be reviewed, to request a review interface of the unreviewed product corresponding to the review control.

In a possible design, when the target object includes a first product, the sending unit 12 sends the first request message carrying the first signal to the server, to cause the server determine to determine, according to the first signal, the first product from an order of the user and generate a review interface of the first product.

In a possible design, the processing unit 11 is further configured to acquire a first picture through the review interface after the display unit 14 displays the review interface, where the first picture is a picture of the first product that has been bought by a user; and generate, according to an edit to the first picture by the user, a second picture carrying review information;

the sending unit 12 is further configured to send the second picture to the server.

In a possible design, the sending unit 12 is further configured to send a third request message to the server to request to acquire AR review information flows of a second product, where the second product is a product that is being browsed by a user through the terminal device;

the receiving unit 13 is further configured to receive the AR review information flows sent by the server, where the AR review information flows include at least one type of review information, and attributes of respective types of AR review information at least include a number of review times and/or review intention;

the displaying unit 14 is further configured to display, according to the number of review times and/or review intention of the respective types of AR review information, the AR review information flows.

In a possible design, the processing unit 11 is further configured to determine, after the displaying unit 14 displays the AR review information flows according to the number of review times and/or review intention of the respective types of AR review information, a first type of AR review information according to a click operation by the user, where the first type of AR review information is an information flow in the AR review information flows which is clicked by the user through a touch screen of the terminal device;

the displaying unit 14 is further configured to display at least one piece of AR review information corresponding to the first type of AR review information.

The apparatus for entering a review interface provided by the embodiment of the present application can execute actions of the terminal device in FIG. 2 and the above optional embodiments, the implementation principles and technical effects of which are similar, and will not be repeated here.

Figure 11:
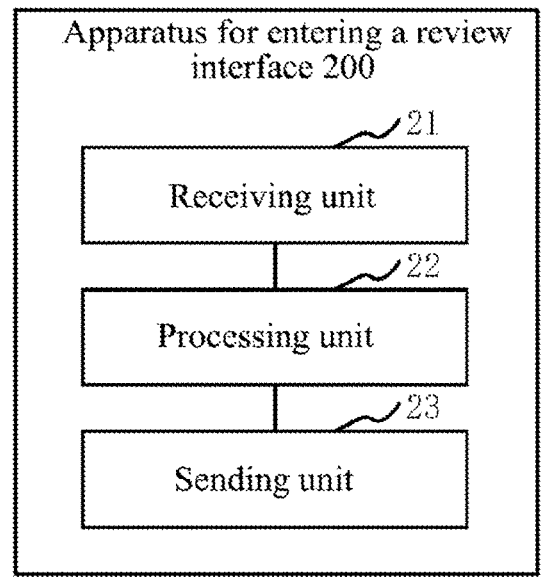
FIG. 11 is a schematic structural diagram of another apparatus for entering a review interface provided by an embodiment of the present application.

FIG. 11 is a schematic structural diagram of another apparatus for entering a review interface provided by an embodiment of the present application. The apparatus for entering a review interface involved in the present embodiment may be a server, or may be a chip applied to the server. The apparatus for entering a review interface can be configured to execute functions of the server in FIG. 2 or the above optional embodiments. As shown in FIG. 11, the apparatus for entering a review interface 200 may include:

a receiving unit 21, configured to receive a first request message sent by a terminal device, where the first request message is sent by the terminal according to a first signal after the terminal device scans a target object through an augmented reality AR scanning method to acquire the first signal, where the first signal is used to trigger the terminal device to enter a review interface;

a processing unit 22, configured to generate the review interface according to the first request message;

a sending unit 23, configured to send a first response message to the terminal device, where the first response message carries data for generating the review interface.

In a possible design, when the target object includes a target hand gesture, and the receiving unit 21 is further configured to receive, before receiving the first request message sent by the terminal device, a second request message sent by the terminal device;

the sending unit 23 is further configured to send a second response message to the terminal device, where the second response message carries data for generating an interface of a product to be reviewed, where the interface of the product to be reviewed includes a review control of at least one unreviewed product.

In a possible design, when the target object includes a first product, and the first product is any one of products having been bought by the user, the receiving unit 21 receives the first request message carrying the first signal sent by the terminal device;

the processing unit 22 is configured to determine, according to the first signal, a first product from an order of the user and generate a review interface of the first product.

In a possible design, the receiving unit 21 is further configured to receive, after the sending unit 23 sends the first response message to the terminal device, a second picture carrying review information sent by the terminal device, where the second picture is obtained by editing, by the terminal device, a first picture.

In a possible design, the receiving unit 21 is further configured to receive a third request message sent by the terminal device, where the third request message is used to request to acquire AR review information flows of a second product, where the second product is a product that is being browsed by the user through the terminal device;

the processing unit 22 is further configured to acquire at least one piece of review information on the second product, and process the at least one piece of review information to obtain the augmented reality AR review information flows;

the sending unit 23 is further configured to send the AR review information flows to the terminal device.

In a possible design, when processing the at least one piece of review information to obtain the augmented reality AR review information flows, the processing unit 22 extracts at least one keyword from each piece of review information of the at least one piece of review information; filters the at least one keyword to acquire emotional keywords; counts a number of review times for respective ones of emotional keywords; clusters the at least one piece of review information according to frequency and/or emotional intention, and obtain the AR review information flows according to a clustering result.

The apparatus for entering a review interface provided by the embodiment of the present application can execute actions of the server in the above embodiments, the implementation principles and technical effects of which are similar, and will not repeated here.

It should be noted that, it should be understood that the above receiving unit, when implemented practically, may be a receiver, and the above sending unit, when implemented practically, may be a transmitter. And the processing unit may be implemented in a form that a processing element calls software; or be implemented in a form of hardware. For example, the processing unit may be a processing element set independently, or be implemented by being integrated in a certain chip in the above apparatus, or in addition, may be stored in a memory of the above apparatus in a form of program code, and called by a processing element of the above apparatus to execute the functions of the processing unit. In addition, all of or part of the units may be integrated together, or be implemented independently. The processing element described here may be a kind of integrated circuit having a capability of processing signals. In the implementation process, respective steps of the above-mentioned method or above-mentioned respective units may be completed by an integrated logic circuit of hardware in a processor element or instructions in a form of software.

For example, the above-mentioned units may be one or more integrated circuits configured to implement the above-mentioned methods, for example: one or more application specific integrated circuits (application specific integrated circuit, ASIC), or, one or more micro-processors (digital signal processor, DSP), or, one or more field programmable gate array (field programmable gate array, FPGA), etc. For another example, when a certain unit mentioned above is implemented in the form that the processing element calls the program codes, the processing element may be a general processor, such as a central processing unit (central processing unit, CPU) or other processors able to call program code. For another example, the units may be integrated together, and implemented in a form of system-on-a-chip (system-on-a-chip, SOC).

Figure 12:
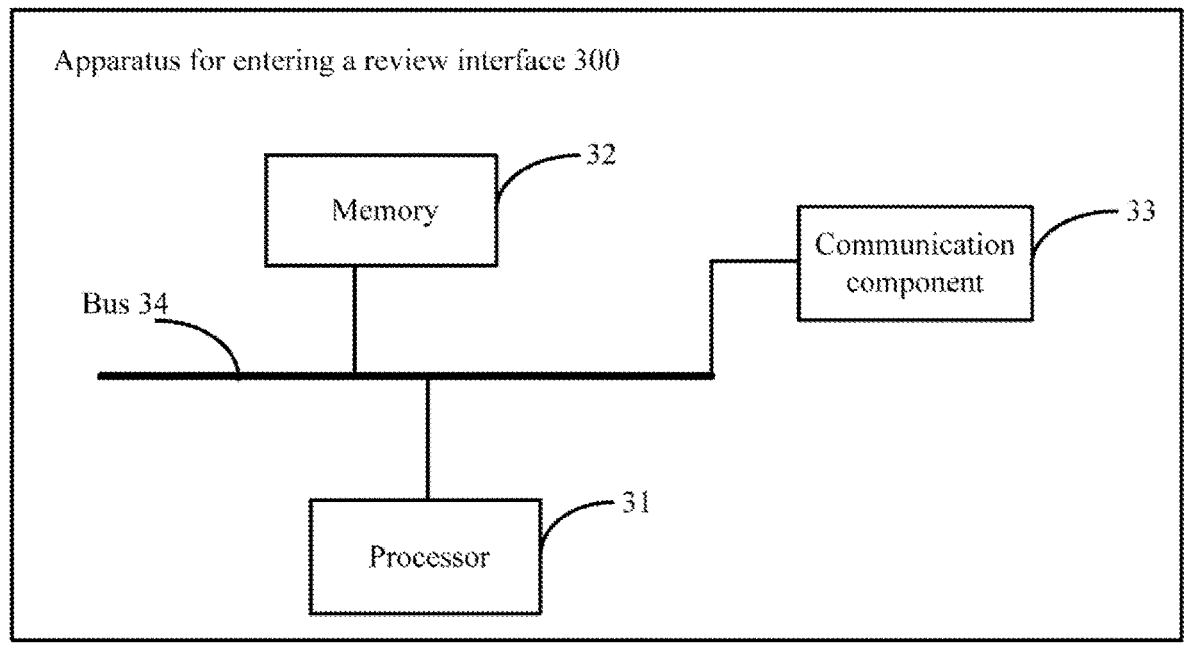
FIG. 12 is a schematic structural diagram of still another apparatus for entering a review interface provided by an embodiment of the present application.

FIG. 12 is a schematic structural diagram of another apparatus for entering a review interface provided by an embodiment of the present application. As shown in FIG. 12, the apparatus for entering a review interface 300 includes:

at least one processor 31 and a memory 32;

the memory 32 stores computer execution instructions;

the at least one processor 31 executes the computer execution instructions stored on the memory 32, to cause the at least one processor 31 to execute the method for entering a review interface executed by the terminal device described above or the method for entering a review interface executed by the server described above.

For the specific implementation process of the processor 31, reference can be made to the above method embodiments, the implementation principles and technical effects of which are similar, and will not be repeated here in the present embodiment.

Optionally, the apparatus for entering a review interface 300 further includes a communication component 33, where the processor 31, the memory 32 and the communication component 33 may be connected by a bus 34.

An embodiment of the present application further provides a storage medium, where the storage medium stores computer execution instructions therein, and the computer execution instructions, when executed by the processor, are used to implement the above-mentioned method for entering a review interface.

An embodiment of the present application further provides a computer program product, and when the computer program product is running on a computer, the computer is caused to execute the above-mentioned method for entering a review interface.

In the above-mentioned embodiments, it should be understood that, the devices and methods described may be implemented in other ways. For example, the above-mentioned device embodiments are only illustrative. For example, the division of the modules is only a division in logic functions, and there may be other dividing methods in practical implementation, for example, multiple modules may be combined or may be integrated into another system, or some features may be ignored or not executed. For another aspect, the mutual coupling or direct coupling or communication connection displayed or discussed may be indirect coupling or communication connection through some interfaces, apparatuses or modules, which may be electrical, mechanical or in other forms.

The modules illustrated as separated components may be or may be not physically separated, the components displayed as modules may be or may be not physical units, that is, may be located in one place, or may be distributed in multiple network units. Part of or all of the modules may be selected according to practical needs to implement the purpose of the solutions of the present embodiments.

In addition, the respective functional modules in the respective embodiments of the present application may be integrated into one processing unit, or the respective functional modules may exist independently, or two or more modules may be integrated in one unit. The units formed by the above modules may be implemented in a form of hardware, or in a form of hardware plus software functional units.

The integrated modules implemented in the form of software functional units may be stored in a computer-readable storage medium. The above-mentioned software functional modules are stored in a storage medium, including multiple instructions used to cause an electronic device (which may be a personal computer, a server, or a network device, etc.) or a processor to execute part of the steps of the method of the respective embodiments of the present application.

It should be understood that, the above-mentioned processor may be a central processing unit (CPU), or other general processor, a digital signal processor (DSP), an application specific integrated circuit (ASIC), etc. The general processor may be a micro-processor, or the processor may also be any regular processor, etc. Steps in combination with the method disclosed by the application can be directly embodied as be executed and completed by a hardware processor, or be executed and completed by a combination of hardware and software modules in the processor.

The memory may include high-speed RAM memory, may also further include a nonvolatile memory NVM, for example, at least one disk memory, and may also be a U disk, a mobile hard disk, a read-only memory, a magnetic disk or an optical disk, etc.

The bus may be an industry standard architecture (industry standard architecture) bus, a peripheral component interconnect (PCI) bus or an extended industry standard architecture (EISA) bus, etc. The bus may be divided into an address bus, a data bus, a control bus, etc. For convenience of representation, the bus in the accompanying drawings of the present application is not limited to having only one bus or one type of bus.

The above-mentioned storage medium may be implemented by any type of volatile or nonvolatile storage devices or combinations thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium may be any available medium that can be stored and accessed by a general or application specific computer.

An illustrative storage medium is coupled to the processor, so as to cause the processor able to read information from the storage medium, and able to write information into the storage medium. Of course, the storage medium may also be an integral part of the processor. The processor and the storage medium may be located in application specific integrated circuits (ASIC). Of course, the processor and the storage medium may also exist in a terminal or a server as separate components.

It should be understood by those of ordinary skills in the art: all of or part of the steps to implement the above-mentioned respective embodiments can be completed by a program instructing hardware. The previously mentioned program may be stored in a computer-readable storage medium. When running, the program executes the steps in the above-mentioned respective method embodiments; and the previously mentioned storage medium includes various media that can store program codes such as a ROM, a RAM, a magnetic disk or an optical disk, etc.

It needs to be noted at last: the above respective embodiments are only used to illustrate technical solutions of the present application, but not to limit them; although the present application is illustrated in detail with reference to previously mentioned embodiments, it should be understood by those of ordinary skills in the art: modifications can still be made to the technical solutions recorded in the previously mentioned respective embodiments, or equivalent substitutions can be made to part of or all of technical features therein; and the modifications and substitutions do not make the essence of the corresponding technical solutions depart from the scope of the technical solutions of the respective embodiments of the present application.

What is claimed is:

1. A method for entering a review interface, comprising:
scanning, by a terminal device, a target object by using an augmented reality (AR) scanning method to acquire a first signal, wherein the first signal is used to trigger the terminal device to enter a review interface;
sending, by the terminal device, a first request message to a server according to the first signal, wherein the first request message is used to request the review interface;
receiving, by the terminal device, a first response message sent by the server, wherein the first response message carries data for generating the review interface; and
generating and displaying, by the terminal device, the review interface according to the first response message,
wherein the target object comprises a target hand gesture, and the sending, by the terminal device, a first request message to a server according to the first signal comprises:
determining, by the terminal device, whether a similarity between the target hand gesture corresponding to the first signal and a pre-stored hand gesture exceeds a preset threshold;
in response to the similarity between the target hand gesture corresponding to the first signal and the pre-stored hand gesture exceeding the preset threshold, sending, by the terminal device, a second request message to the server, to request an interface of a product to be reviewed, wherein the interface of the product to be reviewed comprises a review control of at least one unreviewed product;
receiving, by the terminal device, a second response message sent by the server, wherein the second response message carries data for generating the interface of the product to be reviewed; and
sending, by the terminal device, a first request message to the server according to a review control clicked by a user on the interface of the product to be reviewed, to request a review interface of the unreviewed product corresponding to the review control, and wherein, after generating and displaying, by the terminal device, the review interface according to the first response message, the method further comprises:

acquiring, by the terminal device, a first picture through the review interface, wherein the first picture is a picture of a first product having been bought by the user;

generating, by the terminal device, according to an edit to the first picture by the user, a second picture carrying review information; and sending, by the terminal device, the second picture to the server;

wherein before the scanning, by a terminal device, a target object by using an augmented reality (AR) scanning method to acquire a first signal, the method further comprises:

clicking an application on the terminal device to enter a web page, and clicking a Scan control and selecting AR scanning.

2. The method according to claim 1, wherein the first product is any one of products having been bought by the user, and wherein the sending, by the terminal device, a first request message to a server according to the first signal comprises:

sending, by the terminal device, the first request message carrying the first signal to the server, to cause the server to determine, according to the first signal, the first product from an order of the user and generate a review interface of the first product.

3. The method according to claim 1, further comprising:

sending, by the terminal, a third request message to the server to request to acquire AR review information flows of a second product, wherein the second product is a product that is being browsed by the user through the terminal device;

receiving, by the terminal, the AR review information flows sent by the server, wherein the AR review information flows comprises at least one type of review information, and attributes of respective types of AR review information at least comprise a number of review times and/or review intention; and displaying, by the terminal device, the AR review information flows according to the number of review times and/or the review intentions of the respective types of AR review information.

4. The method according to claim 3, wherein, after the displaying, by the terminal device, the AR review information flows according to the number of review times and/or the review intention of the respective types of AR review information, the method further comprises:

determining, by the terminal device, according to a click operation by the user, a first type of AR review information, wherein the first type of AR review information is an information flow in the AR review information flows which is clicked by the user through a touch screen of the terminal device; and displaying, by the terminal device, at least one piece of AR review information corresponding to the first type of AR review information.

5. An apparatus for entering a review interface, comprising:

a memory, a processor, a transmitter, a receiver and a computer program stored on the memory and executable on the processor, wherein the processor, when running the computer program, is configured to:

scan a target object by using an augmented reality (AR) scanning method to acquire a first signal, wherein the first signal is used to trigger a terminal device to enter a review interface;

control the transmitter to send a first request message to a server according to the first signal, wherein the first request message is used to request the review interface;

control the receiver to receive a first response message sent by the server, wherein the first response message carries data for generating the review interface; and display the review interface, wherein the processor is further configured to:

determine, when the target object comprises a target hand gesture, whether a similarity between the target hand gesture corresponding to the first signal and a pre-stored hand gesture exceeds a preset threshold;

control the transmitter to send, when it is determined that the similarity between the target hand gesture corresponding to the first signal and the pre-stored hand gesture exceeds the preset threshold, a second request message to the server to request an interface of a product to be reviewed, wherein the interface of the product to be reviewed comprises a review control of at least one unreviewed product;

control the receiver to receive a second response message sent by the server, wherein the second response message carries data for generating the interface of the product to be reviewed; and control the transmitter to send the first request message to the server according to a review control clicked by a user on the interface of the product to be reviewed, to request the review interface of the unreviewed product corresponding to the review control, and wherein the processor is further configured to:

acquire a first picture through the review interface after displaying the review interface, wherein the first picture is a picture of a first product having been bought by a user; and generate, according to an edit to the first picture by the user, a second picture carrying review information; and control the transmitter to send the second picture to the server;

wherein before the processor scans a target object by using an augmented reality (AR) scanning method to acquire the first signal, the user clicks an application on the terminal device to enter a web page, and clicks a Scan control and selects AR scanning.

6. The apparatus according to claim 5, wherein the processor is configured to:

control the transmitter to send, when the target object comprises the first product, the first request message carrying the first signal to the server, to cause the server to determine, according to the first signal, the first product from an order of the user and generate a review interface of the first product.

7. The apparatus according to claim 5, wherein the processor is further configured to:

control the transmitter to send a third request message to the server to request to acquire AR review information flows of a second product, wherein the second product is a product that is being browsed by the user through the terminal device;

control the receiver to receive the AR review information flows sent by the server, wherein the AR review information flows comprises at least one type of review information, and attributes of respective types of AR review information at least comprise a number of review times and/or review intention; and display the AR review information flows according to the number of review times and/or the review intention of the respective types of AR review information.

8. A non-transitory computer-readable storage medium, wherein the computer readable storage medium has instructions stored thereon, and the instructions, when executed, cause an electronic device to execute the method according to claim 1.

9. The method according to claim 1, wherein each product to be reviewed corresponds to one review control.

* * * * *